(12) United States Patent
Yalovsky et al.

(10) Patent No.: US 7,296,220 B2
(45) Date of Patent: Nov. 13, 2007

(54) METHOD AND SYSTEM FOR CREATING A TABLE IN A TEXT EDITING APPLICATION

(75) Inventors: Mark Yalovsky, Seattle, WA (US); Donovan P. Lange, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 254 days.

(21) Appl. No.: 11/018,410

(22) Filed: Dec. 20, 2004

(65) Prior Publication Data

US 2006/0136807 A1   Jun. 22, 2006

(51) Int. Cl.
*G06F 17/00* (2006.01)
(52) U.S. Cl. .................. 715/503; 715/509; 715/510; 715/530
(58) Field of Classification Search .......... 715/503, 715/504, 509, 510, 505, 500, 530
See application file for complete search history.

(56) References Cited

U.S. PATENT DOCUMENTS 6,112,216 A * 8/2000 Pratley et al. ............ 715/509
6,678,865 B1 * 1/2004 Pratley et al. ............ 715/509
6,687,875 B1 * 2/2004 Suzuki ..................... 715/503
2005/0210372 A1 * 9/2005 Kraft et al. ............... 715/509

OTHER PUBLICATIONS

Microsoft Word 2000 Screenshots, Dec. 31, 1999, pp. 1-21.*
Microsoft Word 2000 Screenshots, Dec. 31, 1999, pp. 22-30.*

* cited by examiner

*Primary Examiner*—Stephen Hong
*Assistant Examiner*—Adam L Basehoar
(74) *Attorney, Agent, or Firm*—Merchant & Gould P.C.; Ryan T. Grace (57) ABSTRACT

A table is created using keystrokes on a keyboard. Text to the left of a cursor is contained in a first column of the table when the table is created. Text to the right of the cursor is contained in a second column of the table when the table is created. Ghost feedback may be displayed to indicate a new empty row at the bottom of an existing table. When the cursor reaches the border of the first column as the user enters text, the width of the first column is increased while the width of the table is increased. If the width of the table is at a maximum value the widths of other columns in the table are decreased.

18 Claims, 8 Drawing Sheets

| Item | Cost |
|---|---|
| Apple | $0.39/ea. |
| Banana | $0.20/lb. |

METHOD AND SYSTEM FOR CREATING A TABLE IN A TEXT EDITING APPLICATION

BACKGROUND OF THE INVENTION

Notebook text editing applications are popular in classroom and business meeting settings because a user can quickly enter information without being confined to strict formatting rules common to formal word processing applications. While taking class notes or business meeting minutes, the user may need to enter a table into the document. However, the table cannot be quickly established within the document without further formatting input from the user. For example, the user may be prompted to enter parameters for shading, three dimensional effects, vertical cell alignment, and merged cells within the body of the table. The time expended to format the table may cause the user to be distracted from the speaker such that important information is not recorded.

SUMMARY OF THE INVENTION

The present invention is directed to a process for creating a table in a text editing program. A cursor is positioned within a line of text or at the end of the line of text. The user may press a particular key on a keyboard (e.g., the Tab key) to create the table. The text to the left of cursor before the table was created is contained in the first table cell of table. The text to the right of the cursor (if any) is contained in the second table cell of the table in the same row as the first table cell. A new column may be added to the table by pressing a particular key on a keyboard (e.g., the Tab key). A new row may be added to table when a particular key input is received from a keyboard (e.g., the Ctrl and Enter keys) and typing new content in the newly displayed table cell.

In another embodiment, ghost feedback is displayed to indicate a new empty row at the bottom of an existing table. The cursor appears in the first table cell of the new empty row to indicate the location of text to be entered. Typing any content with the ghost feedback on creates a new row in place of the ghost feedback. A ghost feedback row may be converted to a new column by pressing a particular key on the keyboard (e.g., the Tab key) and typing any character.

In yet another embodiment, the width of columns in the table are automatically resized. Table may be initially created with columns of equal width separated by borders. The user may enter text into a table cell in a first column. When the cursor reaches the border of the adjacent column as the user enters text, the width of the first column is increased while the width of the table is increased. If the width of the table is at a maximum value the widths of other columns in the table are decreased.

The user may then enter text in a table cell in a second column of the table. When the cursor reaches the border of the second column as the user continues to enter text, the width of the second column is increased while the width of the table is increased. If the width of the table is at a maximum value the width of the first column is decreased. The width of the second column continues to increase as the user enters more text. The width of the second column is increased and if the width of the table is at a maximum value the width of the first column is decreased until the widths of the first and second columns are equal. The decrease in the width of the first column causes the text in the first table cell to be wrapped to the next line. Text in the table cell of the second column may also be wrapped depending on the amount of text the user entered.

DETAILED DESCRIPTION OF THE PREFERRED EMBODIMENT

The present invention is directed to a process for creating a table in a text editing program. A cursor is positioned within a line of text or at the end of the line of text. The user may press a particular key on a keyboard (e.g., the Tab key) to create the table. The text to the left of cursor before the table was created is contained in the first table cell of table. The text to the right of the cursor (if any) is contained in the second table cell of the table in the same row as the first table cell. A new column may be added to the table by pressing a particular key on a keyboard (e.g., the Tab key). A new row may be added to table when a particular key input is received from a keyboard (e.g., simultaneously pressing the Ctrl and Enter keys) and typing new content in the newly displayed table cell.

In another embodiment, ghost feedback is displayed to indicate a new empty row at the bottom of an existing table. The cursor appears in the first table cell of the new empty row to indicate the location of text to be entered. Typing any content with the ghost feedback on creates a new row in place of the ghost feedback. A ghost feedback row may be converted to a new column by pressing a particular key on a keyboard (e.g., the Tab key) and typing any character.

In yet another embodiment, the width of columns in a table are automatically sized. When the cursor reaches the border of the first column as the user continues to enter text, the width of the first column is increased while the width of the table is increased. If the width of the table is at a maximum value the width of the other columns in the table are decreased. The user may then enter text in a table cell in a second column of the table. When the cursor approaches the border of the second column as the user continues to enter text, the width of the second column is increased while the width of the table is increased. If the width of the table is at a maximum value the width of the first column is decreased. The width of the second column is increased and the width of the first column is decreased until the widths of the first and second columns are equal.

Illustrative Operating Environment

Figure 1:
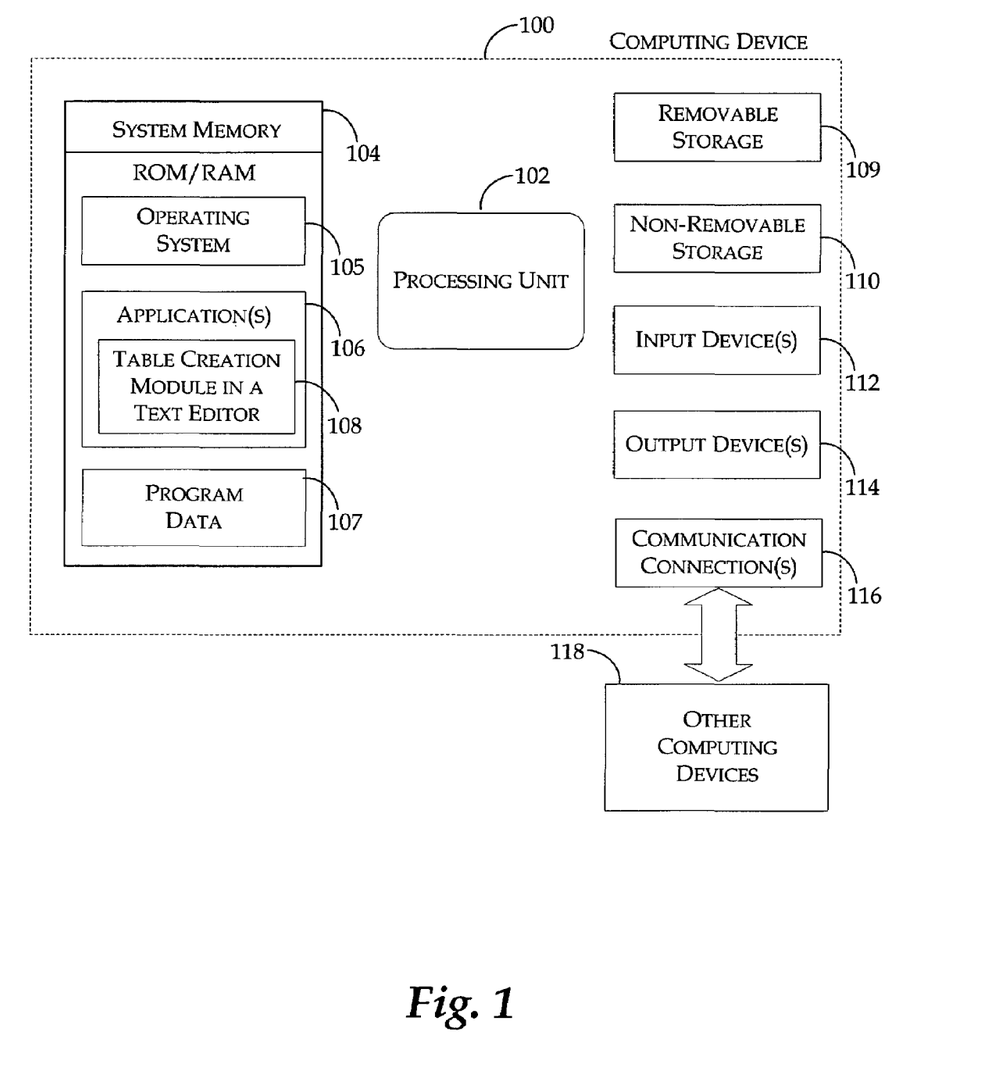
FIG. 1 illustrates a computing device that may be used according to an example embodiment of the present invention.

With reference to FIG. 1, one example system for implementing the invention includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. A table creation module in a text editor 108, which is described in detail below, is implemented within applications 106.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Table Creation in a Text Editing Program

Figure 2:
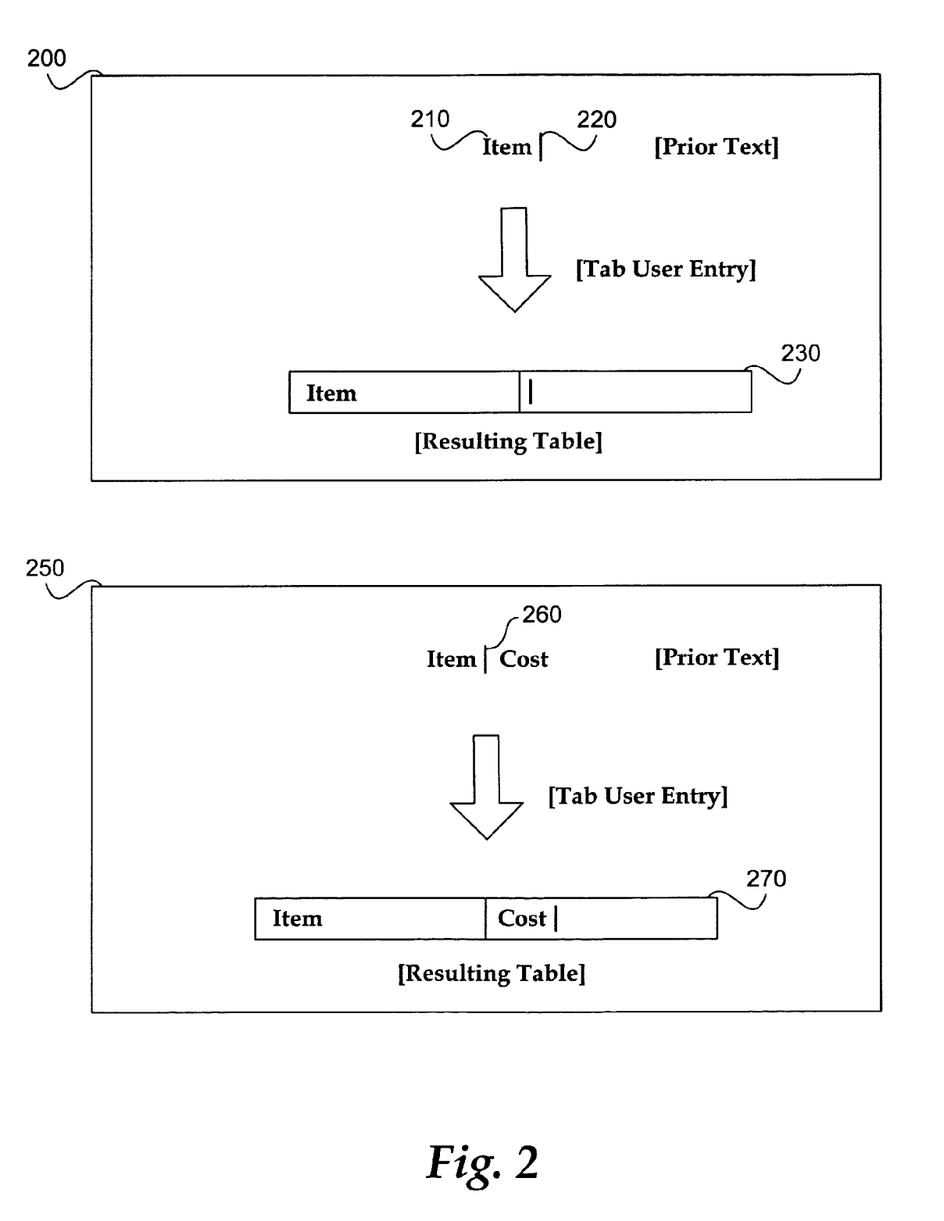
FIG. 2 illustrates an example of table creation in a text editing program, in accordance with the present invention.

FIG. 2 illustrates an example of table creation in a text editing program. In one embodiment, the table is created in a text container of a notebook application, such as OneNote® developed by the Microsoft Corporation of Redmond, Wash. The table includes table cells arranged in rows and columns.

A text editing document may be shown as visual output on display 200. A user types content 210 in the document. For example, the user may type the word "Item." Cursor 220 appears to the right of content 210. The user may press a particular key on a key board (e.g., the Tab key) to create table 230 including borders that indicate the edge of the table and the separation between different columns and rows. Content 210 to the left of cursor 220 is placed in the first table cell of table 220. Cursor 220 appears in the second table cell in the same row as the first table cell.

Another example is shown with reference to display 250. Cursor 260 is positioned within a line of text (i.e., between "item" and "cost"). The user may press a particular key on a keyboard (e.g., the Tab key) such that table 270 is created. The text to the left of cursor 260 before the table was created is contained in the first table cell of table 270. The text to the right of cursor 260 before the table was created is contained in the second table cell of table 270. The second table cell is included in the same row as the first table cell. A new column may be added to table 270 by pressing a particular key on a keyboard (e.g., the Tab key). A new row may be added to table 270 when a particular key input is received from a keyboard (e.g., simultaneously pressing the Ctrl and Enter keys) and typing new content in the newly displayed table cell. A new row may be inserted between existing rows in a table when a particular key input is received from a keyboard (e.g., the Ctrl and Enter keys). Additional embodiments of the present invention may include other functionality (e.g., table deletion, table cell/row/column reordering, etc.) based on other user inputs (e.g., other keystrokes, pointing device selections, etc.) than the functionality and user inputs described herein.

Figure 3:
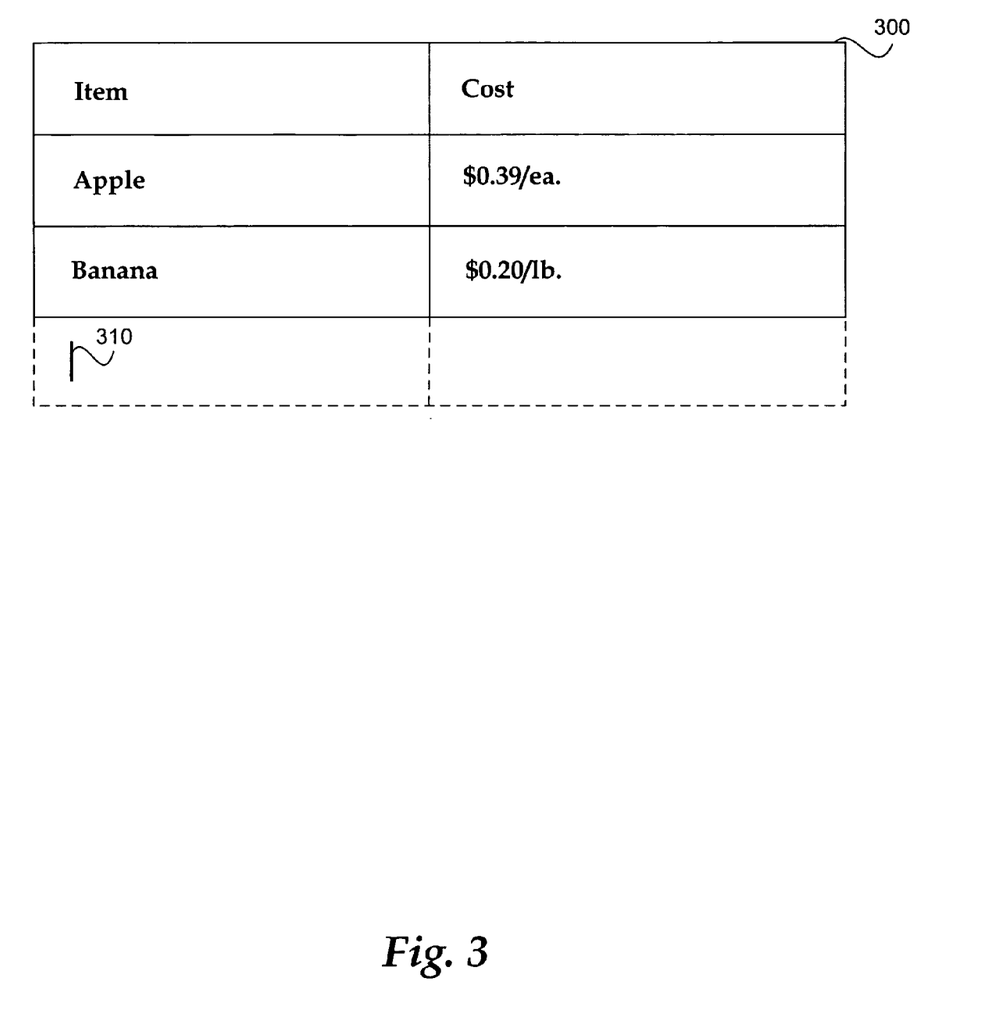
FIG. 3 illustrates an example of displaying ghost feedback in a table, in accordance with the present invention.

FIG. 3 illustrates an example of displaying ghost feedback in a table. Ghost feedback is displayed to indicate a new empty row at the bottom of an existing table. The user may create table 300 by typing "Item", pressing a particular key on a keyboard (e.g., the Tab key), typing "Cost", pressing the Enter key, typing "Apple", pressing a particular key on a keyboard (e.g., the Tab key), typing "$0.39/ea.", pressing the Enter key, typing "Banana", pressing a particular key on a keyboard (e.g., the Tab key), and typing "$0.20/lb." Ghost feedback (indicated in dashed lines) is displayed the next time the user presses the Enter key. Cursor 310 appears in the first table cell of the new empty row to indicate the location of text to be entered. Typing any content with the ghost feedback on creates a new row (including any borders) in place of the ghost feedback. In one embodiment, a ghost row may be converted to a new column by pressing a particular key on a keyboard (e.g., the Tab key) and typing any character.

A user may not wish to enter new text in the table cell shown in the ghost feedback. Ghost feedback allows a user to easily exit a table while entering data with a keyboard. The user may press the Enter key, or may click the cursor in an area external to table 300 to remove the ghost feedback and exit the user from table 300. Upon exiting table 300, cursor 310 may be placed in a new text container at the same level as the leftmost table cell in the ghost feedback. The ghost feedback does not reappear if a user navigates back under table 300. Once the ghost feedback is removed, the line where the ghost feedback was displayed is no longer a part of table 300.

Figure 4:
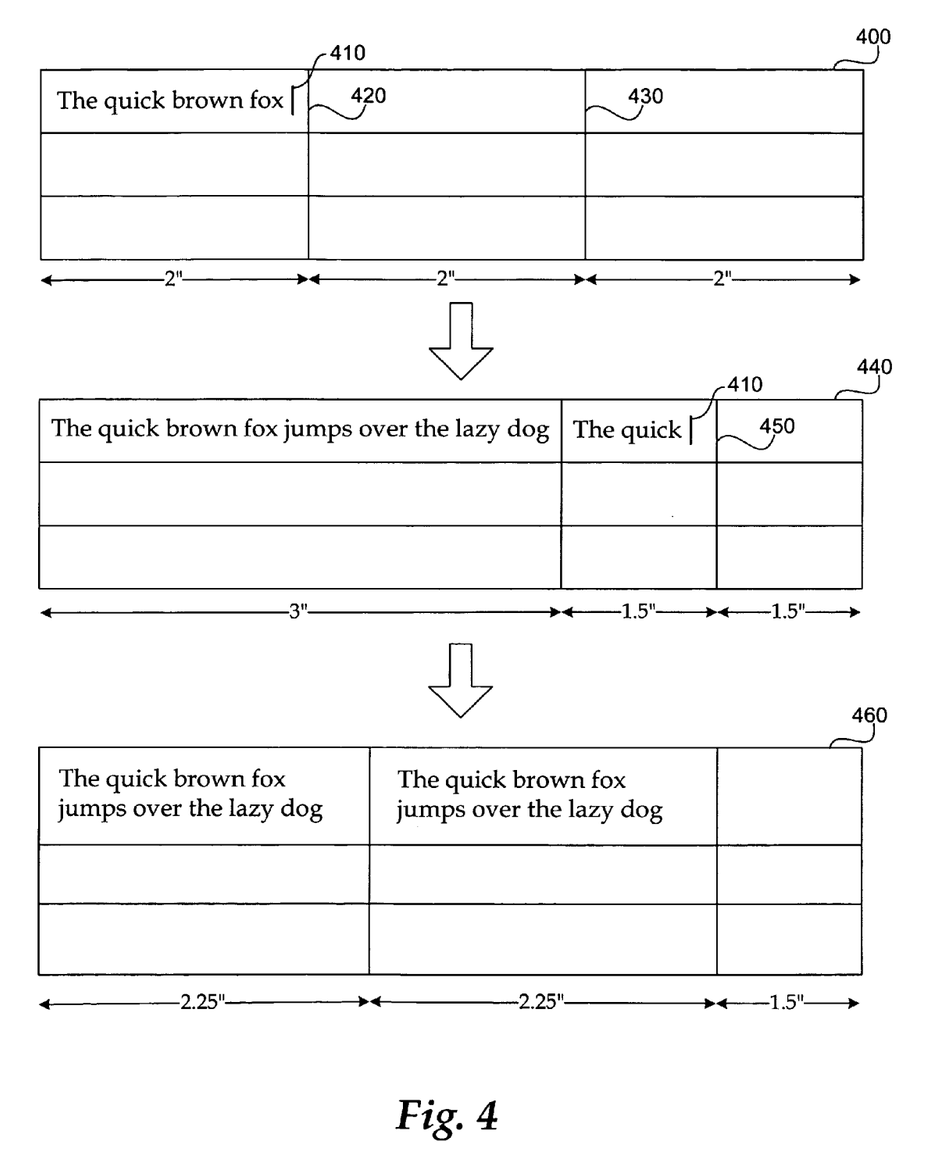
FIG. 4 illustrates an example of automatically sizing the width of columns in a table, in accordance with the present invention.

FIG. 4 illustrates an example of automatically sizing the width of columns in a table. In order to simplify understanding of the invention, the table is described with reference to three columns. However, it is understood that table 400 may have any number of columns without limiting the invention as described in the claims.

Table 400 includes three columns of equal width separated by borders 420, 430. For example, each column may be 2 inches wide. The user may enter text into a table cell in the first column (e.g. The quick brown fox). When cursor 410 reaches border 420 and the user continues to enter text (e.g., jumps over the lazy dog), the width of the table may increase. In another embodiment, borders 420, 430 are moved to the right such that that the widths of the second and third columns are decreased an equal amount. For example, as shown in table 440, the width of the first column may be increased to 3 inches as a result of the text added by the user, and the widths of the second and third columns may be each decreased to 1.5 inches. In one embodiment, the user may establish a minimum width of a column. Alternatively, the minimum column width may be a default setting.

The user may then enter text in a table cell in the second column. If the text does not extend to border 450, then column width readjustments are not necessary. However, when cursor 410 reaches border 450, the width of the table may increase. In another embodiment, the width of the second column is increased, the width of the first column is decreased, and the width of the third column remains the same. The width of the second column continues to increase as the user enters more text. As shown in table 460, the width of the second column is increased and the width of the first column is decreased until the widths of the first and second columns are equal. The decrease in the width of the first column causes the text in the first table cell to be wrapped to the next line. Text in the second table cell may also be wrapped depending on the amount of text the user entered.

Figure 5:
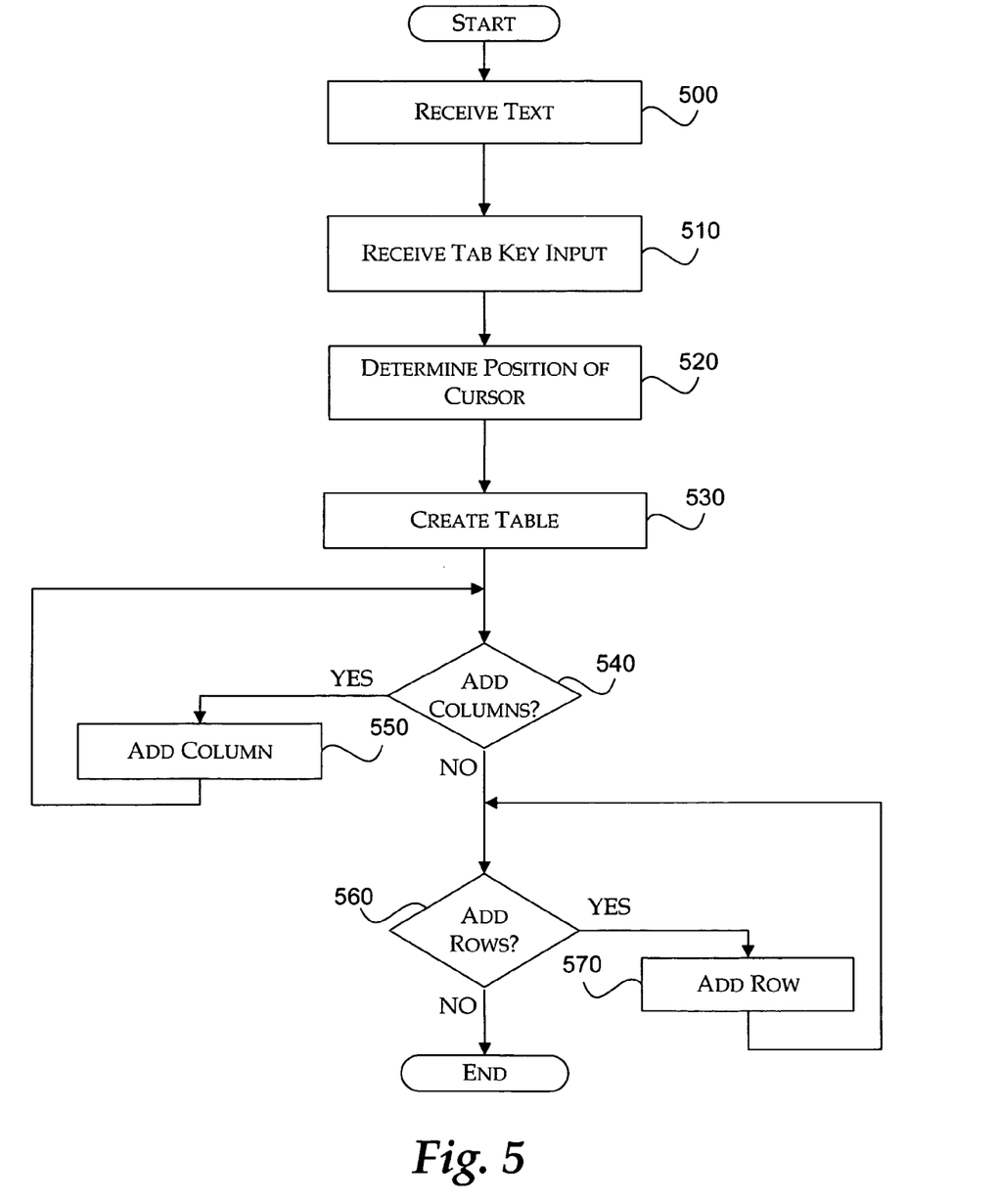
FIG. 5 is an operational flow diagram illustrating a process for creating a table in a text editing program, in accordance with the present invention.

FIG. 5 is an operational flow diagram illustrating a process for creating a table in a text editing program. The process begins at a start block where a text editing document is loaded from system memory in a computing device. Moving to block 500, the text editing program receives text entered by a user. Advancing to block 510, the text editing program receives notice that the user has pressed a particular key on a keyboard (e.g., the Tab key) to create a table.

Transitioning to block 520, the position of the cursor relative to the received text is determined. If the Tab key is pressed when the cursor is positioned at the end of the received text, then the received text is included in a table cell in the first column of the table and the cursor is positioned in a table cell in the second column of the table. If the Tab key is pressed when the cursor is positioned within the received text (i.e., not at the end), then the received text to the left of the cursor is included in the table cell of the first column of the table and the received text to the right of the cursor is included in the table cell of the second column of the table.

Continuing to block 530, the table is created. The table may initially include one row and two columns. The received text is displayed in the table as discussed above.

Proceeding to decision block 540, a determination is made whether the user wants to add more columns to the table. The user may indicate that no more columns are to be added to the table when a particular key input is received from a keyboard (e.g., simultaneously pressing the Ctrl and Enter keys). The user may indicate that a new column is to be added by pressing a particular key on a keyboard (e.g., the Tab key). If the user does not want to add more columns, processing proceeds to decision block 560. If the user wants to add more columns to the table, processing proceeds to block 550 where a column is added to the table. Processing then returns to decision block 540 to determine whether any more columns are to be added to the table.

Moving to decision block 560, a determination is made whether the user wants to add more rows to the table. The user may indicate that no more rows are to be added to the table by pressing a particular key on a keyboard (e.g., the Enter key), or by clicking the cursor in an area of the document external to the table. The user may indicate that a new row is to be added by entering new text. If the user does not want to add more rows, processing terminates at an end block. If the user wants to add more rows to the table, processing proceeds to block 570 where a row is added to the table. Processing then returns to decision block 560 to determine whether any more rows are to be added to the table.

Figure 6:
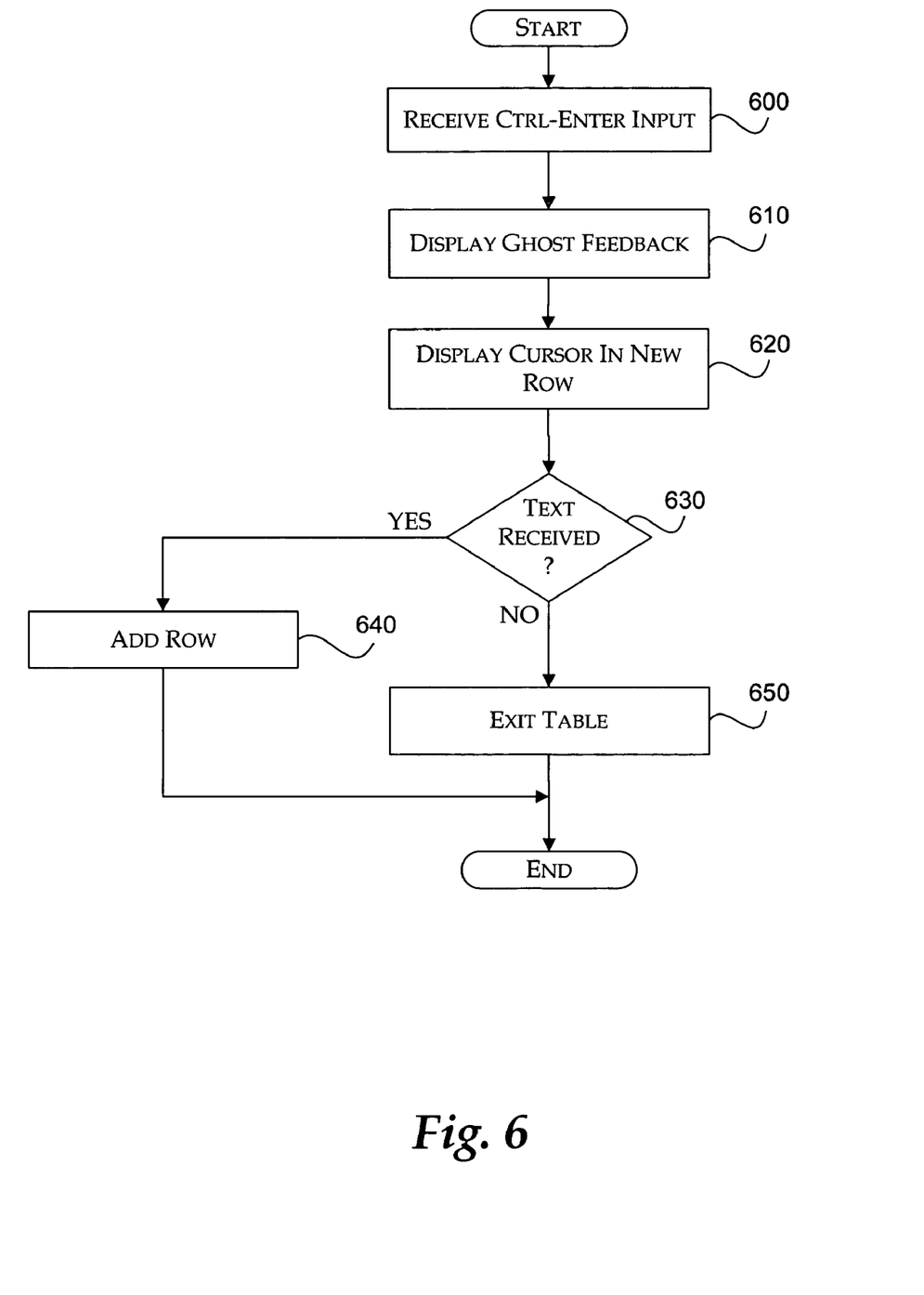
FIG. 6 is an operational flow diagram illustrating a process for displaying ghost feedback for a row in a table, in accordance with the present invention.

FIG. 6 is an operational flow diagram illustrating a process for displaying ghost feedback for a row in a table. The process begins at a start block where a table is created in a text editing program. The table includes at least one row and two columns. Moving to block 600, the text editing program receives notice that a particular key input has been received from a keyboard (e.g., the Ctrl and Enter keys simultaneously) at the end of a row in the table. Transitioning to block 610, ghost feedback is displayed to indicate the location of a new empty row at the bottom of the table. Continuing to block 620, the cursor is displayed in the first table cell of the ghost feedback.

Proceeding to decision block 630, a determination is made whether text is received in the first table cell of the ghost feedback. If the user has entered text, processing continues at block 640 where the ghost feedback is removed and a new row is added to the table at the location indicated by the ghost feedback. Any borders are also added to the new row. Processing then terminates at an end block. If the user has not entered text (e.g., the user presses the Enter key), processing continues at block 650 where the user exits the table. Processing then terminates at the end block.

Figure 7:
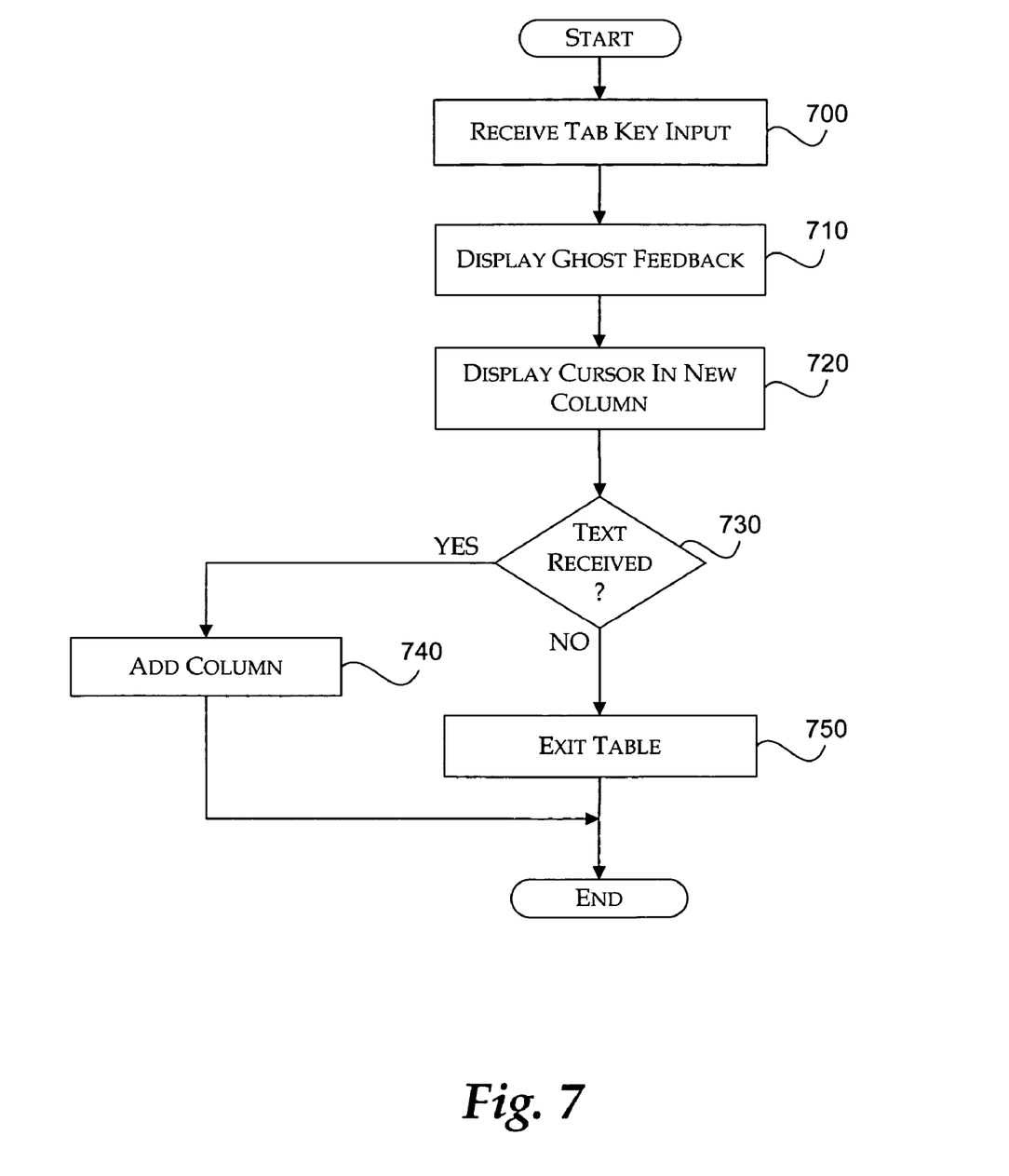
FIG. 7 is an operational flow diagram illustrating a process for displaying ghost feedback for a column in a table, in accordance with the present invention.

FIG. 7 is an operational flow diagram illustrating a process for displaying ghost feedback for a column in a table. The process begins at a start block where a table is created in a text editing program. The table includes at least one row and two columns. Moving to block 700, the text editing program receives notice that the user has pressed a particular key on a keyboard (e.g., the Tab key) at the end of a row in the table. Transitioning to block 710, ghost feedback is displayed to indicate the location of a new empty column to the right of the table. Continuing to block 720, the cursor is displayed in the upper table cell of the ghost feedback.

Proceeding to decision block 630, a determination is made whether text is received in the upper table cell of the ghost feedback. If the user has entered text, processing continues at block 740 where the ghost feedback is removed and a new column is added to the table at the location indicated by the ghost feedback. Any borders are also added to the new column. Processing then terminates at an end block. If the user has not entered text (e.g., the user presses the Enter key), processing continues at block 750 where the user exits the table. Processing then terminates at the end block.

Figure 8:
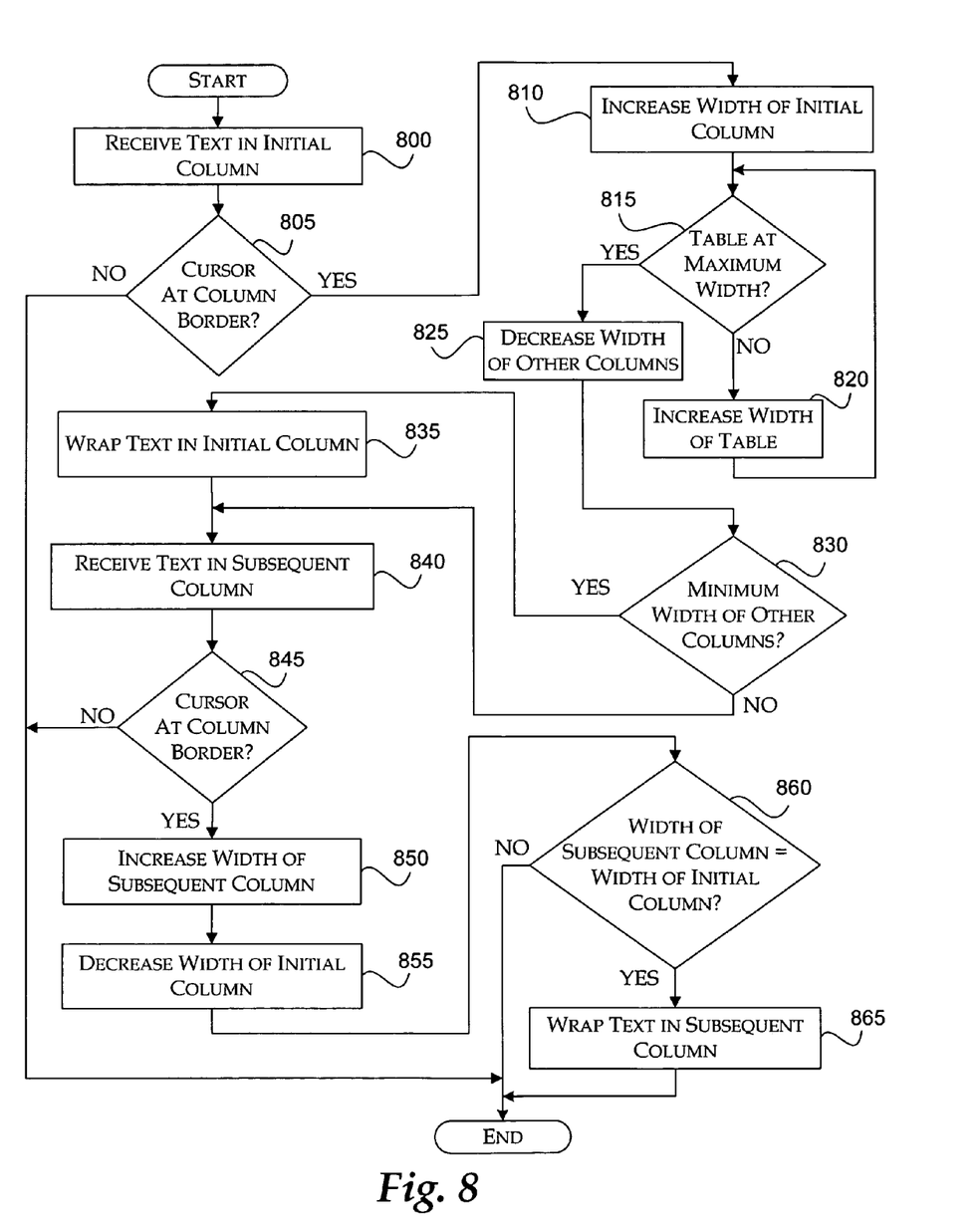
FIG. 8 is an operational flow diagram illustrating a process for automatically sizing the width of columns in a table, in accordance with the present invention.

FIG. 8 is an operational flow diagram illustrating a process for automatically sizing the width of columns in a table. The process begins at a start block where a table is created in a text editing program. The table includes at least one row and two columns. The columns may be initially displayed with equal widths. Moving to block 800, text is received on a first line of a table cell in an initial column of the table.

Continuing at decision block 805, a determination is made whether the cursor is located at the border between the initial column and the column to the right of the initial column. The cursor would be located at the border if the user entered sufficient text to fill the first line of the table cell in the initial column. If the cursor is not located at the border, processing terminates at an end block because column width expansion is not necessary. If the cursor is located at the border, processing proceeds to block 710.

Advancing to block 810, the width of the initial column is increased as more text is entered into the first line of the table cell. Continuing to decision block 815, a determination is made whether the width of the table is at a maximum value. In one embodiment, maximum value may be assigned by a user. In another embodiment, the maximum value is related to the width of a document that includes the table. In yet another embodiment, the maximum value may be a default value. If the width of the table is at a maximum value, processing continues at block 825. If the width of the table has not reached a maximum value, processing continues at block 820.

Moving to block 820, the width of the table is increased. Processing continues to decision block 815. Transitioning to block 825, the width of other columns in the table are decreased because the width of the table is at a maximum value. In one embodiment, the width of the other columns in the table are decreased by an equal amount.

Proceeding to decision block 830 a determination is made whether the width of the other columns has reached a minimum value. The minimum value may be assigned by a user. Alternatively, the minimum value may be a default value. If the width of the other columns has not reached the minimum value, processing continues at block 840. If the width of the other columns is the minimum value, processing continues at block 835.

Moving to block 835, the text in the initial column is wrapped such that any newly entered text appears below the first line in the table cell of the initial column. The text continues to wrap in the table cell until no more text is received. Continuing to block 840, text is received on a first line of a table cell in a subsequent column of the table. The subsequent column may be any other column in the table. In one embodiment, the subsequent column is the column to the right of the initial column.

Advancing to decision block 845, a determination is made whether the cursor is located at the border between the subsequent column and the column to the right of the subsequent column. The cursor would be located at the border if the user entered sufficient text to fill the first line of the table cell in the subsequent column. If the cursor is not located at the border, processing terminates at an end block because width expansion of the subsequent column is not necessary. If the cursor is positioned at the border, processing proceeds to block 850.

Transitioning to block 850, the width of the subsequent column is increased as new text is added to the first line of the text cell in the subsequent column. Proceeding to block 855, the width of the initial column is decreased while the width of the subsequent column is increased when the width of the table is at a maximum value.

Moving to decision block 860, a determination is made whether the width of the subsequent column is equal to the width of the initial column. If the width of the subsequent column has not been sufficiently increased to equal the width of the initial column, processing terminates at the end block. If the width of the subsequent column has been sufficiently increased and the width of the initial column has been sufficiently decreased such that both width values are essentially equal, processing continues at block 865. Continuing at block 865, any newly received text in the table cell of the subsequent column is wrapped such that the new text appears below the first line of the table cell. Processing then terminates at the end block.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for creating a table in a text editing application, comprising:
   receiving a line of text in a text editing document;
   determining the location of a text entry cursor in the line of text, wherein the text entry cursor divides the line of text into a first string and a second string;
   in response to receiving an input from a key, automatically creating an initial table with a number of columns including a first column a second column and other columns, wherein the first column includes the first string and the second column includes the second string;
   automatically increasing the width of the first column when text is being added to the first column and the text entry cursor reaches a border that separates the first column and the second column;
   automatically increasing the width of the table when the width of the table is not at a maximum value;
   automatically decreasing the widths of the second column and other columns in the table an equal amount when the width of the table is at a maximum value;
   determining whether the width of the second column and the width of the other columns have obtained minimal width values; and
   automatically wrapping the text being added to the first column when the width of the second column and the width of the other columns have obtained minimal width values.

2. The computer-implemented method of claim 1, wherein the initial table is created in response to receiving a particular key input from a keyboard.

3. The computer-implemented method of claim 1, wherein the first string includes the content of the line of text between the beginning of the line of text and the location of the text entry cursor.

4. The computer-implemented method of claim 1, wherein the second string includes the content of the line of text between the text entry cursor and the end of the line of text.

5. The computer-implemented method of claim 1, further comprising creating a new column in the table in response to receiving a particular key input from a keyboard.

6. The computer-implemented method of claim 1, further comprising creating a new row in the table in response to receiving a particular key input from a keyboard.

7. The computer-implemented method of claim 1, further comprising automatically displaying ghost feedback in response to receiving a particular key input from a keyboard, wherein the ghost feedback indicates the location of a new empty row at the bottom of the table, wherein an input in the ghost feedback creates the new empty row at the bottom of the initial table, wherein an input outside the ghost feedback removes the ghost feedback from being displayed.

8. The computer-implemented method of claim 7, further comprising creating a new column in response to receiving a particular key input from a keyboard.

9. The computer-implemented method of claim 7, further comprising:
   exiting the table when the ghost feedback is removed from being displayed.

10. The computer-implemented method of claim 1, further comprising:
   receiving text in the second column;
   increasing the width of the second column when the text entry cursor reaches a border between the second column and a column to the right of the second column;
   increasing the width of the table when the width of the table is not at a maximum value;
   decreasing the width of the first column when the width of the table is at a maximum value, wherein the width of the second column does not exceed the width of the first column; and
   wrapping text in the first column.

11. The computer-implemented method of claim 10, further comprising wrapping text in the second column when the width of the second column is equal to the width of the first column.

12. A computer-readable storage medium having computer-executable instructions for creating a table in a text editing application, comprising:
   receiving a line of text in a text editing document;
   determining the location of a text entry cursor in the line of text;
   in response to receiving an input from a key, automatically dividing the line of text into a first section and a second section, wherein the first section includes the content of the line of text between the beginning of the line of text and the location of the text entry cursor, and wherein the second section includes the content of the line of text between the location of the text entry cursor and the end of the line of text;
   automatically creating a table with a number of columns including a first column that is adjacent to a second column and other columns, wherein the first column includes the first section and the second column includes the second section;
   increasing the width of the first column when text is being added to the first column and the text entry cursor reaches a boarder that separates the first column and the second column;
   increasing the width of the table when the width of the table is not at a maximum value;
   decreasing the widths of the second column and other columns in the table an equal amount when the width of the table is at a maximum value;
   determining whether the width of the second column and the width of the other columns have obtained minimal width values; and
   automatically wrapping the text being added to the first column when the width of the second column and the width of the other columns have obtained minimal width values.

13. The computer-readable storage medium of claim 12, further comprising creating a new column in the table in response to receiving a particular key input from a keyboard.

14. The computer-readable storage medium of claim 12, further comprising creating a new row in the table in response to receiving a particular key input from a keyboard.

15. The computer-readable storage medium of claim 12, further comprising automatically displaying ghost feedback in response to receiving a particular key input from a keyboard, wherein the ghost feedback indicates the location of a new empty row at the bottom of the table, wherein an input in the ghost feedback creates the new empty row at the bottom of the initial table, wherein an input outside the ghost feedback removes the ghost feedback from being displayed.

16. The computer-readable storage medium of claim 15, further comprising creating a new column in response to receiving a particular key input from a keyboard.

17. The computer-readable storage medium of claim 15, further comprising:
   exiting the table when the ghost feedback is removed from being displayed.

18. A system for creating a table in a text editing program, comprising:
   means for receiving a line of text in a text editing document;
   means for determining the location of a text entry cursor in the line of text;
   means for dividing the line of text into a first section and a second section, wherein the first section includes the content of the line of text between the beginning of the line of text and the location of the text entry cursor, and wherein the second section includes the content of the line of text between the location of the text entry cursor and the end of the line of text;
   means for automatically creating an initial table, in response to receiving an input from a key, with a number of columns including a first column a second column and other columns, wherein the first column includes the first section and the second column includes the second section;
   means for automatically increasing the width of the first column when text is being added to the first column and the text entry cursor reaches a border that separates the first column and the second column;
   means for automatically increasing the width of the table when the width of the table is not at a maximum value;
   means for automatically decreasing the widths of the second column and other columns in the table an equal amount when the width of the table is at a maximum value;
   means for determining whether the width of the second column and the width of the other columns have obtained minimal width values;
   means for automatically wrapping the text being added to the first column;
   means for receiving text in the second column;
   means for increasing the width of the second column when the text entry cursor reaches a border between the second column and a column to the right of the second column; and
   means for decreasing the width of the first column when the width of the table is at a maximum value, wherein the width of the second column does not exceed the width of the first column.

* * * * *